(12) United States Patent
Kim et al.

(10) Patent No.: US 10,337,138 B2
(45) Date of Patent: Jul. 2, 2019

(54) APPARATUS OF MANUFACTURING AEROGEL SHEET

(71) Applicant: LG CHEM, LTD, Seoul (KR)

(72) Inventors: Ye Hon Kim, Daejeon (KR); Je Kyun Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 100 days.

(21) Appl. No.: 15/576,261

(22) PCT Filed: Feb. 7, 2017

(86) PCT No.: PCT/KR2017/001326
§ 371 (c)(1),
(2) Date: Nov. 21, 2017

(87) PCT Pub. No.: WO2017/146396
PCT Pub. Date: Aug. 31, 2017

(65) Prior Publication Data
US 2018/0148888 A1 May 31, 2018

(30) Foreign Application Priority Data
Feb. 22, 2016 (KR) .................. 10-2016-0020703

(51) Int. Cl.
*D06M 11/79* (2006.01)
*B01J 37/02* (2006.01)
(Continued)

(52) U.S. Cl.
CPC .............. *D06M 11/79* (2013.01); *B01J 31/02* (2013.01); *B01J 37/0215* (2013.01); *B01J 37/04* (2013.01);
(Continued)

(58) Field of Classification Search
CPC .... D04H 1/642; B05C 3/00–109; B05C 3/18; B27K 3/105; B01J 37/0215–0234
See application file for complete search history.

(56) References Cited

U.S. PATENT DOCUMENTS 2,821,158 A * 1/1958 Lenz .................. B05C 13/025
118/206
6,068,882 A 5/2000 Ryu
(Continued)

FOREIGN PATENT DOCUMENTS

JP 2011190136 9/2011
KR 2010053350 5/2010
(Continued)

*Primary Examiner* — Yewebdar T Tadesse
*Assistant Examiner* — Stephen A Kitt
(74) *Attorney, Agent, or Firm* — Dentons US LLP

(57) ABSTRACT

The present invention relates to an apparatus of manufacturing an aerogel sheet. The apparatus of manufacturing the aerogel sheet includes: a tray device in which a fiber sheet is accommodated; a rotation device including a rotation rod to which the tray device is fixed and a driving member rotating the rotation rod so that the tray device is disposed on an upper and lower portion of the rotation rod; an injection device injecting a silica precursor into the tray device disposed on the upper portion of the rotation rod to impregnate the silica precursor into the fiber sheet; and a surface modification device injecting a coating solution into the tray device disposed on the lower portion of the rotation rod to modify a surface of the fiber sheet in which the silica precursor is impregnated.

16 Claims, 10 Drawing Sheets

(51) Int. Cl.
*B05C 3/109* (2006.01)
*B01J 37/04* (2006.01)
*B01J 31/02* (2006.01)
*B65G 47/91* (2006.01)
*B65G 49/00* (2006.01)
*C01B 33/158* (2006.01)

(52) U.S. Cl.
CPC .............. *B05C 3/109* (2013.01); *B65G 47/91* (2013.01); *B65G 49/00* (2013.01); *C01B 33/158* (2013.01); *C01B 33/1585* (2013.01)

(56) References Cited

U.S. PATENT DOCUMENTS

| | | | |
|---|---|---|---|
| 6,239,038 B1 * | 5/2001 | Wen | H01L 21/67023 438/745 |
| 6,364,953 B1 | 4/2002 | Kawakami et al. | |
| 2013/0065111 A1 * | 3/2013 | Kim | H01M 2/38 429/163 |
| 2013/0312661 A1 * | 11/2013 | Shih | C03C 17/001 118/500 |
| 2013/0312666 A1 * | 11/2013 | Shih | H01L 21/67126 118/728 |
| 2015/0336126 A1 * | 11/2015 | Barber | B05C 3/09 427/58 |

FOREIGN PATENT DOCUMENTS

| | | |
|---|---|---|
| KR | 20100133268 | 12/2010 |
| KR | 20110126381 | 11/2011 |
| KR | 101105436 | 1/2012 |

* cited by examiner

APPARATUS OF MANUFACTURING AEROGEL SHEET

CROSS-REFERENCE TO RELATED APPLICATION

This application is a National Stage Application of International Application No. PCT/KR2017/001326 filed on Feb. 7, 2017, which claims the benefit of the priority of Korean Patent Application No. 10-2016-0020703, filed on Feb. 22, 2016, both of which are is hereby incorporated by reference in their entirety for all purposes as if fully set forth herein.

TECHNICAL FIELD

The present invention relates to an apparatus of manufacturing an aerogel sheet, and more particularly, to an apparatus of manufacturing an aerogel sheet, which is capable of mass-producing aerogel sheets having the same thickness.

BACKGROUND ART

In general, aerogel is a high porosity material having high porosity of about 90% to about 99% in solids that are known up to date. A silica precursor solution is subjected to sol-gel polymerization reaction to from gel, and then, drying process is performed on the formed gel under supercritical or atmospheric conditions to obtain the aerogel. That is, aerogel has a pore structure filled with air.

The above-described aerogel is lightweight and has physical properties such as heat insulation and sound absorption due to the unique pore structure in which 90% to 99% of an internal space is empty. The greatest advantage of the above-described advantages is the high heat insulation having thermal conductivity of 30 mW/m.k or less, which is significantly lower than thermal conductivity of 36 mW/m.k that is thermal conductivity of an organic insulation material such as conventional Styrofoam and the like.

DISCLOSURE OF THE INVENTION

Technical Problem

The aerogel sheet according to the related art has problems that the sheet has non-uniform thickness and poor heat insulation and durability, and particularly, has a difficulty in mass production.

The present invention has been made to solve the above-mentioned problems, and an object of the prevent invention is to provide an apparatus of manufacturing an aerogel sheet, by which aerogel sheet having heat insulation, durability, and a uniform thickness is mass-produced.

Technical Solution

To achieve the above-described object, an apparatus of manufacturing an aerogel sheet includes: a tray device in which a fiber sheet is accommodated; a rotation device including a rotation rod to which the tray device is fixed and a driving member rotating the rotation rod so that the tray device is disposed on an upper and lower portion of the rotation rod; an injection device injecting a silica precursor into the tray device disposed on the upper portion of the rotation rod to impregnate the silica precursor into the fiber sheet; and a surface modification device injecting a coating solution into the tray device disposed on the lower portion of the rotation rod to modify a surface of the fiber sheet in which the silica precursor is impregnated.

The tray device may include a tray vessel which has a structure that is sealed by a cover and in which the fiber sheet is accommodated and a connection part disposed on one side of the tray vessel and connected to the silica precursor injection device or the surface modification device.

One or more partition walls pushing and fixing the fiber sheet accommodated in the tray vessel may be disposed on a rear surface of the cover.

Each of the partition walls may extend in a longitudinal direction or width direction of the cover and have a plurality of through-holes in a surface thereof.

A gap member having a plurality of punched holes may be disposed between a bottom surface of the tray vessel and a bottom surface of the fiber sheet.

The gap member may include a plate or mesh net having fine punched holes.

The silica precursor injection device may include a silica injection vessel in which the silica precursor is stored and a precursor injection line through which the silica precursor stored in the silica injection vessel is supplied to be injected into the tray device.

The silica precursor may be prepared by mixing silica sol with a gelling catalyst.

The silica sol may be prepared by mixing tetraethyl orthosilicate (TEOS) with ethanol.

The tetraethyl orthosilicate (TEOS) may include hydrolyzed TEOS.

The gelling catalyst may be prepared by mixing ethanol with ammonia water (NH4OH).

The surface modification device may include a coating solution injection vessel in which a coating solution is stored and a coating solution injection line through which the coating solution stored in the coating solution injection vessel is supplied to be injected into the tray device.

The surface modification device may further include a coating solution collection member for collecting the coating solution injected into the tray device into the coating solution injection vessel.

The coating solution collection member may include a suction valve disposed between the tray device and the rotation rod to forcibly discharge the coating solution injected into the tray device through suction force, a coating solution discharge line through which the coating solution discharged by the suction valve is collected into the coating solution injection vessel, and a collection pump generating the suction force in the suction valve.

The coating solution may be prepared by mixing ethanol with ammonia water (NH4OH).

The apparatus may further include a transfer device transferring the fiber sheet up to the tray device or absorbing the fiber sheet of which the surface is modified to transfer the fiber sheet to the outside of the tray device.

Advantageous Effects

In the apparatus of manufacturing the aerogel sheet according to the present invention, the aerogel sheets may be continuously produced to realize the mass production, and particularly, to obtain the aerogel sheet having the heat insulation, the durability, and the uniform thickness.

Also, in the apparatus of manufacturing the aerogel sheet according to the present invention, the partition wall may be provided in the tray device in which the fiber sheet is accommodated to fix the fiber sheet without being shaken.

BRIEF DESCRIPTION OF THE DRAWINGS

FIG. 7 is a view illustrating a state in which a fiber sheet is transferred and then inserted into the tray device, FIG. 8 is a view illustrating a state in which a silica precursor is injected into the tray device, FIG. 9 is a view illustrating a state in which a coating solution is injected into the tray device, and FIG. 10 is a view illustrating a state in which a fiber sheet of which a surface is modified and which is accommodated in the tray device is withdrawn.

MODE FOR CARRYING OUT THE INVENTION

Figure 1:
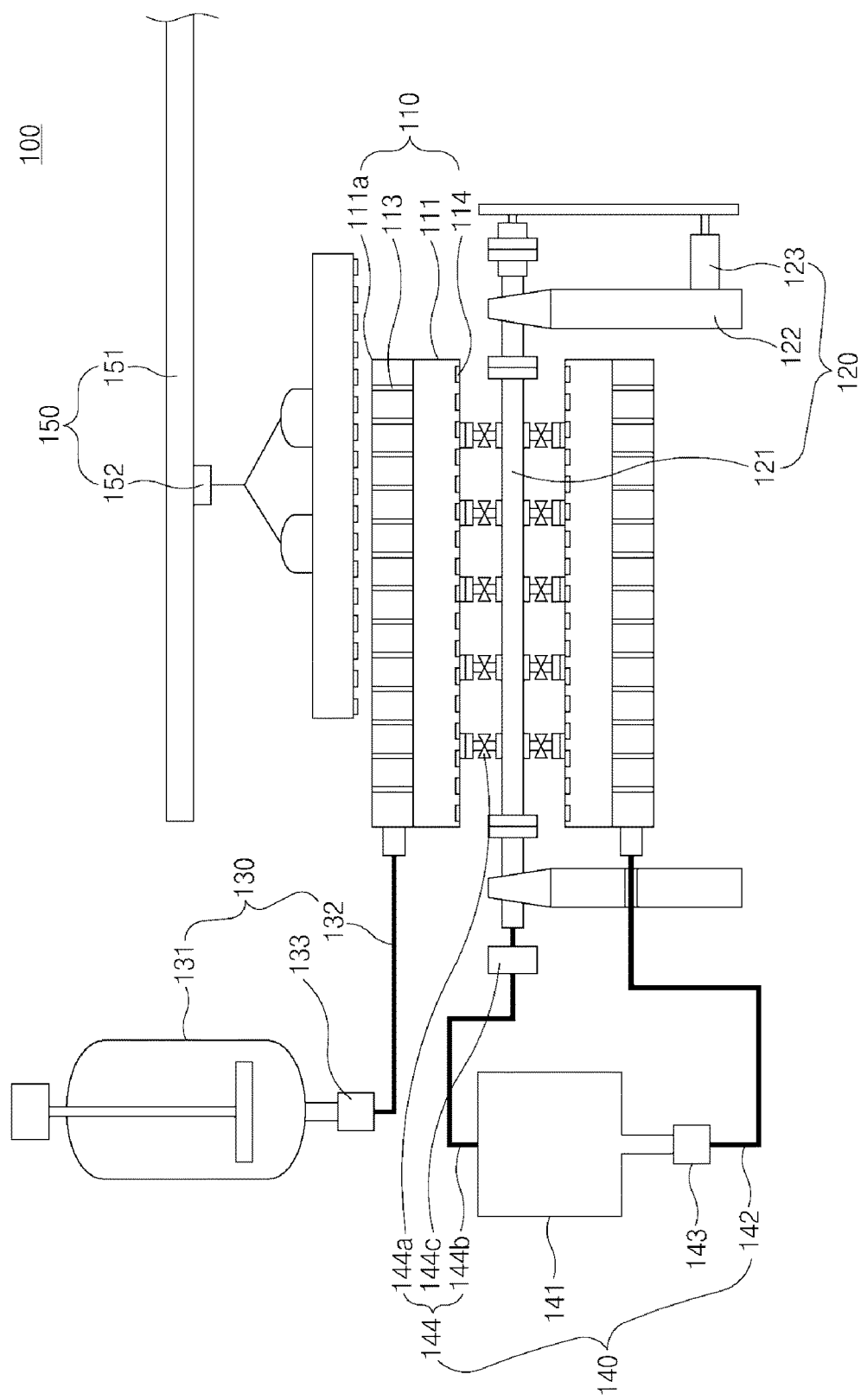
FIG. 1 is a view illustrating an apparatus of manufacturing an aerogel sheet according to the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Apparatus of Manufacturing Aerogel Sheet]

As illustrated in FIG. 1, an apparatus 100 of manufacturing an aerogel sheet according to the present invention includes a tray device 110 in which a fiber sheet 10 is accommodated, a rotation device 120 rotating top and bottom surfaces of the tray device 110 so as to be turned upside down, a silica precursor injection device 130 injecting a silica precursor 20 into the tray device 110, a surface modification device 140 injecting a coating solution 30 into the tray device 110, and a transfer device 150 transferring the fiber sheet 10 up to the tray device 110 or withdrawing the fiber sheet accommodated in the tray device 110.

Tray Device

Figure 2:
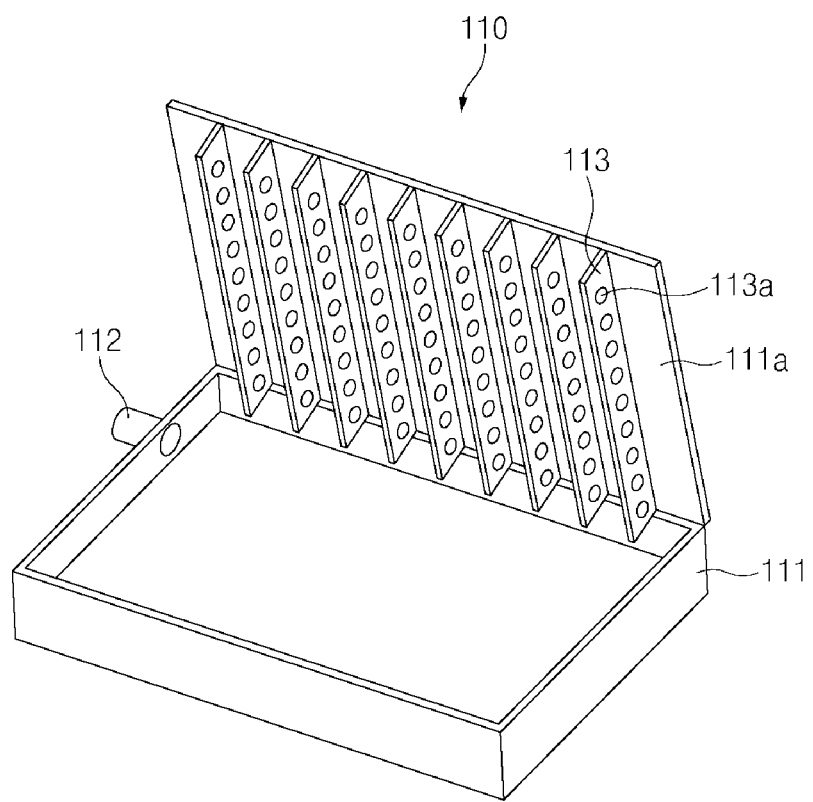
FIG. 2 is a perspective view of a tray device according to the present invention.
Figure 3:
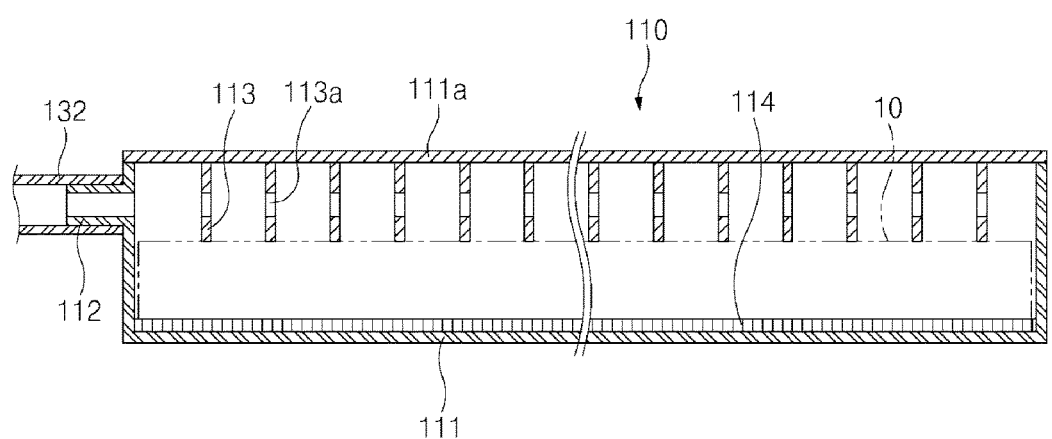
FIG. 3 is a cross-sectional view of the tray device according to the present invention.

As illustrated in FIGS. 2 and 3, the tray device 110 is provided with a tray vessel 111 which has a sealed structure by a cover 111a and in which the fiber sheet 10 is accommodated and a connection part 112 disposed at one side of the try vessel 111 and connected to the silica precursor injection device 130 or the surface modification device 140.

That is, in the tray device 110, when the fiber sheet 10 is put into the tray vessel 111, the cover 111a is closed to seal the inside of the tray vessel 111. Also, the silica precursor 20 of the silica precursor injection device 130 is injected through connection part 112 to impregnate and gelate the silica precursor 20 into the fiber sheet 10, or a coating solution 30 of the surface modification device 140 is injected to modify a surface of the fiber sheet 10.

Here, the connection part 112 and the silica precursor injection device 130 or the connection part 112 and the surface modification device 140 are detachably coupled to each other. Thus, the silica precursor injection device 130 or the surface modification device 140 may be selectively connected to the connection part 112.

The fiber sheet 10 accommodated in the tray vessel 111 is pushed to one side of the tray vessel 111 by centrifugal force to cause defects. To prevent this problem from occurring, the tray device 110 has a structure that is capable of fixing the fiber sheet 10.

That is, one or more partition walls 113 that push the fiber sheet 10 accommodated in the tray vessel 111 to fix the fiber sheet are provided on a rear surface of the cover 111a. The partition walls 113 may extend in a longitudinal direction or width direction of the cover 111a and be provided in plurality at the same interval to push a top surface of the fiber sheet 10 and thereby to fix the fiber sheet 10. Thus, although the tray vessel 111 rotates, the problem in which the fiber sheet 10 is pushed to one side may be solved to previously prevent the defects from occurring.

A plurality of through-holes 113a are defined in a surface of each of the partition walls 113. Thus, the silica precursor 20 or the coating solution 30 may be injected to the entire tray vessel 111 while the silica precursor 20 or the coating solution 30 injected into the tray vessel 111 passes through the through-hole 113a. As a result, the silica precursor 20 may be uniformly impregnated into the entire fiber sheet 10. Also, the coating solution may be uniformly applied to the entire surface of the fiber sheet 10 to uniformly modify the surface of the fiber sheet 10.

The tray device 110 includes a gap member 114 having a plurality of punched holes between the bottom surface of the tray vessel 111 and the fiber sheet 10. That is, when the silica precursor is injected into the tray vessel 111 to gelate the fiber sheet 10, a problem in which a bottom surface of the fiber sheet 10 adheres to the bottom surface of the tray vessel 111 occurs. To prevent this problem from occurring, the gap member 114 may be inserted between the bottom surface of the tray vessel 111 and the fiber sheet 10 to solve the problem in which the fiber sheet 10 adheres to the bottom surface of the tray vessel 111.

Here, the gap member 114 may be a plate or a mesh net having fine punched holes. Also, when the surface modification of the fiber sheet 10 is completed, the gap member 114 may be separated and removed from the fiber sheet 10.

Rotation Device

Figure 4:
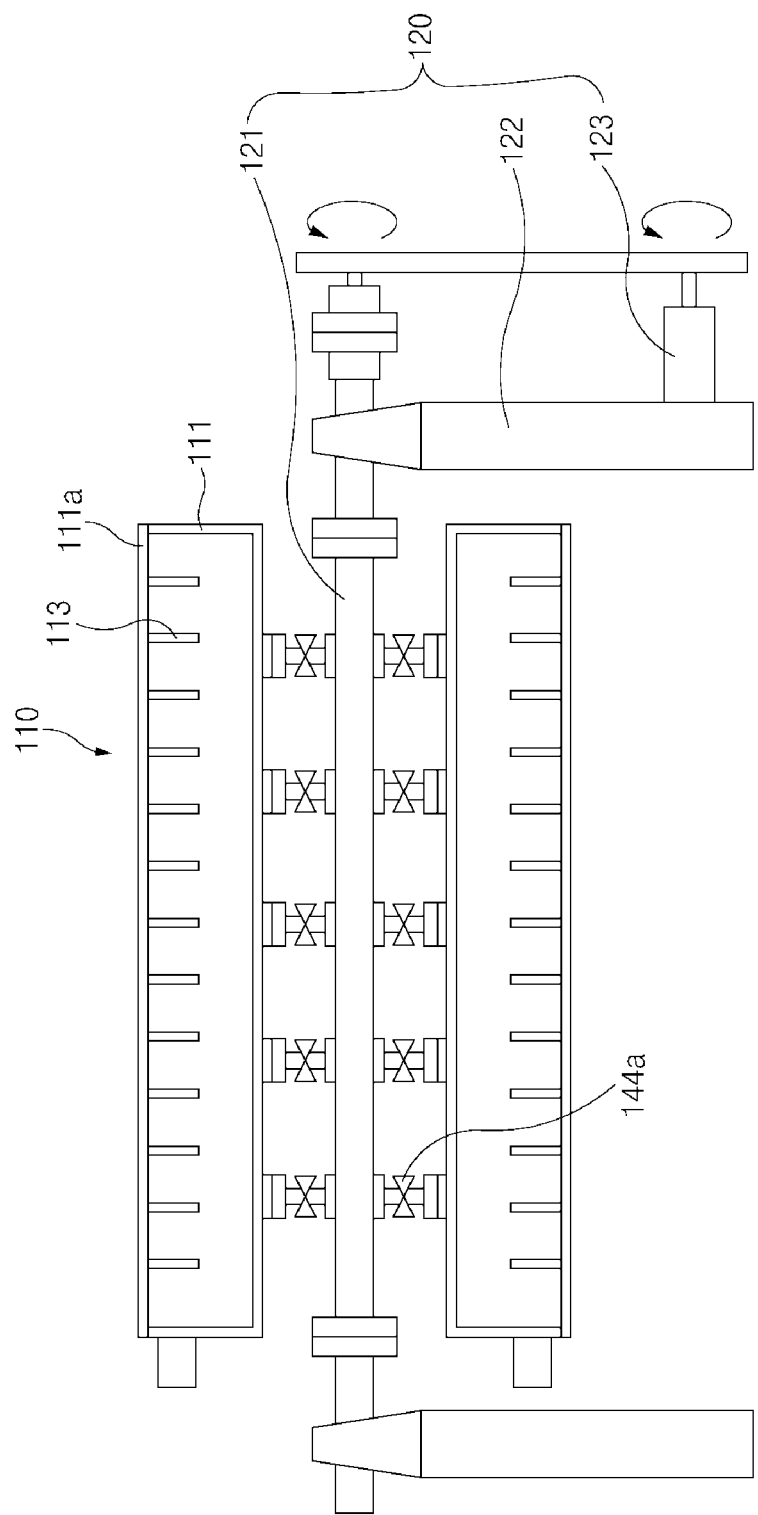
FIG. 4 is a view of a rotation device according to the present invention.

As illustrated in FIG. 4, the rotation device 120 is configured to rotate the tray device and includes a rotation rod 121 to which the tray vessel 111 of the tray device is fixed, a support 122 rotatably fixing the rotation rod 121 in a state of spacing the rotation rod 121 apart from the ground, and a driving member 123 rotating the rotation rod 121 so that the tray vessel 111 is disposed downward from an upper portion of the rotation rod 121 or upward from a lower portion of the rotation rod 121.

That is, the rotation device 120 rotates the rotation rod 121 by the driving member 123 when the driving member 123 rotates, and thus, the tray vessel 111 rotates by be interlocked with the rotation rod 121. Here, the tray vessel 111 rotates about the rotation rod 121.

Here, the driving member 123 may be a driving motor. The driving member 123 that is the driving motor and the rotation rod 121 may be connected to transmit power through a belt.

Silica Precursor Injection Device

Figure 5:
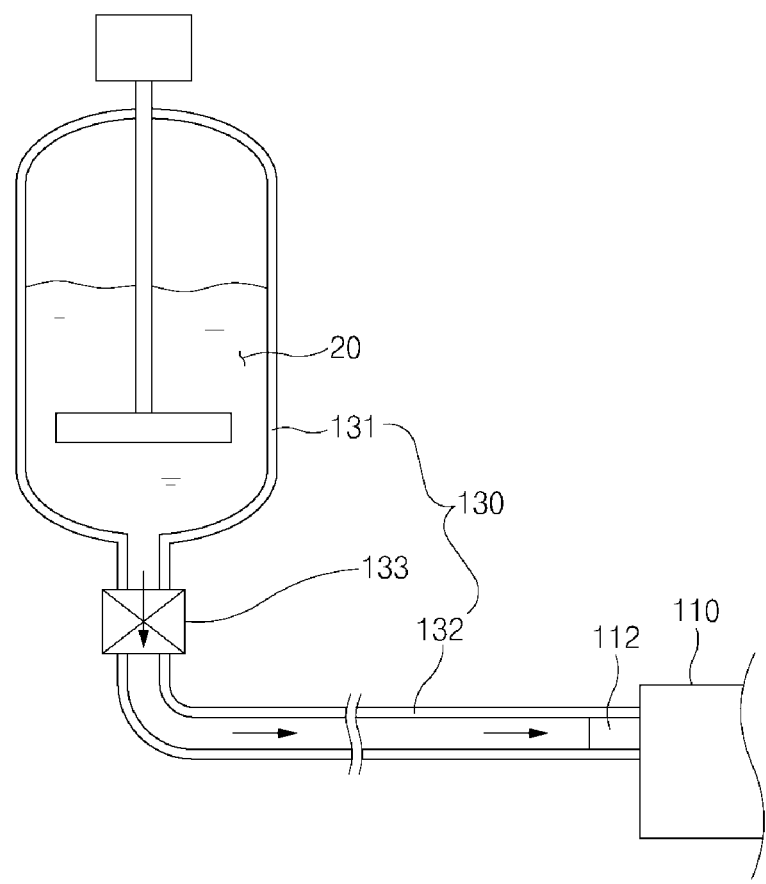
FIG. 5 is a view of a silica precursor injection device according to the present invention.

As illustrated in FIG. 5, the silica precursor injection device 130 includes a silica injection vessel 131 in which the silica precursor 20 is stored and a precursor injection line 132 through which the silica precursor 20 stored in the silica injection vessel 131 is supplied to be injected into the tray vessel 111 through the connection part 112 of the tray device 110. Also, a silica injection pump 133 for forcibly moving the silica precursor 20 stored in the silica injection vessel 131 to the silica injection line 122 is further provided.

Here, the silica precursor 20 is prepared by mixing silica sol with a gelling catalyst to improve simplification and workability of the process.

The silica sol is prepared by mixing tetraethyl orthosilicate (TEOS) with ethanol. That is, 1.2 kg of TEOS and 2.7 kg of ethanol are provided in a reaction bath (not shown) to prepare the silica sol.

The TEOS may use a solvent having high reactivity with water and be hydrolyzed to improve reactivity. That is, the hydrolyzed TEOS and the ethanol may be mixed to obtain the silica sol having excellent reactivity.

The gelling catalyst is prepared by mixing ethanol with ammonia water (NH4OH). That is, 0.5 kg of ethanol and 30 ml of ammonia water (NH4OH) are mixed in the reaction bath (not shown) to prepare the gelling catalyst.

As described above, in the silica precursor injection device 130, when the silica precursor 20 stored in the silica injection vessel 131 is injected into the tray vessel 111 through the precursor injection line 132, the silica precursor 20 is impregnated into the fiber sheet accommodated in the tray vessel 111 and simultaneously gelated to improve the workability.

Surface Modification Device

Figure 6:
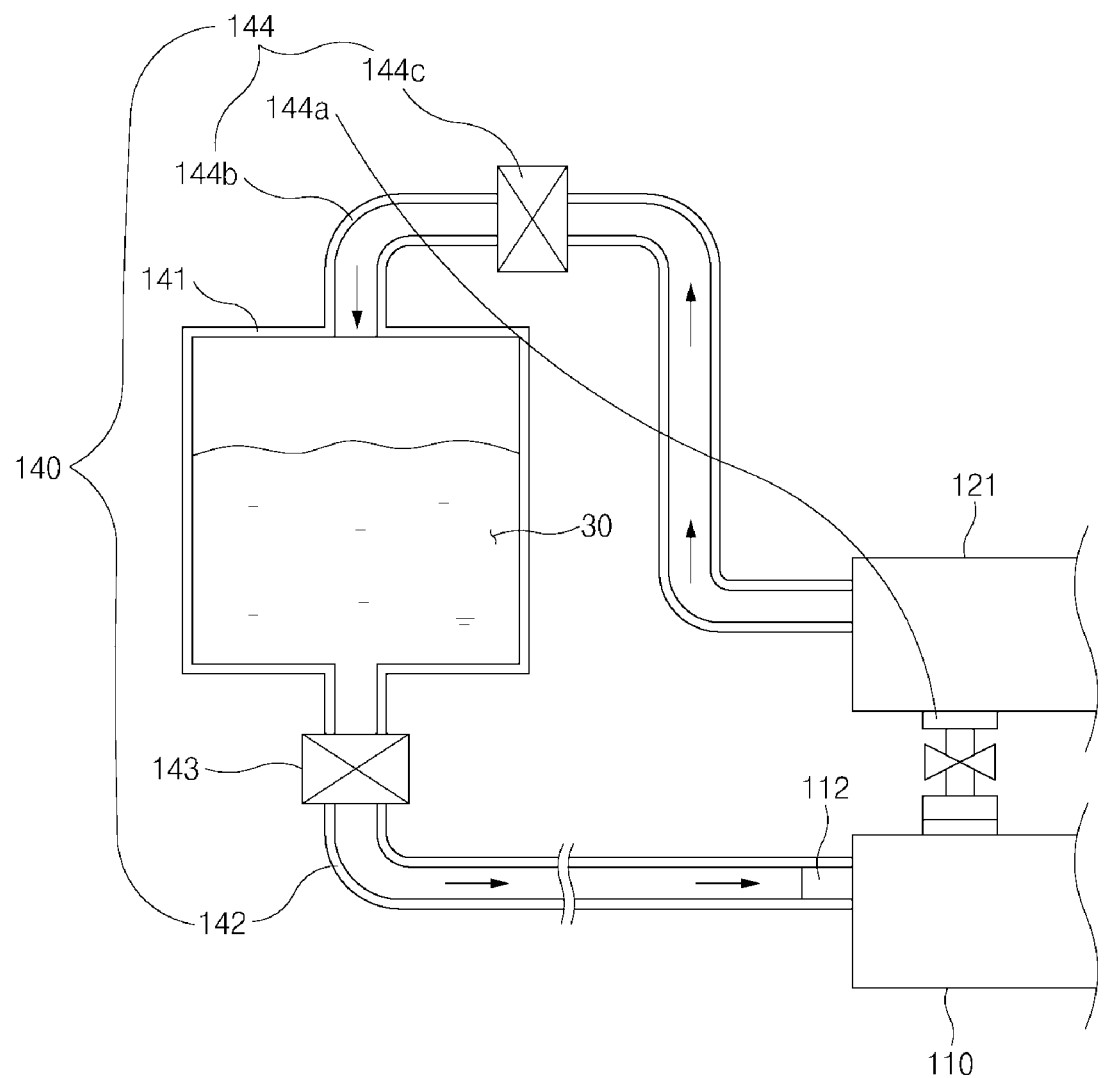
FIG. 6 is a view of a surface modification device according to the present invention.

As illustrated in FIG. 6, the surface modification device 140 includes a coating solution injection vessel 141 in which a coating solution 30 is stored and a coating solution injection line 142 through which the coating solution 30 stored in the coating solution injection vessel 141 is supplied to be injected into the tray vessel 111 through the connection part 112 of the tray device 110. Also, a coating solution injection pump 143 for forcibly moving the coating solution stored in the coating solution injection vessel 141 to the coating solution injection line 142 is further provided.

That is, in the surface modification device 140, the precursor injection line 132 coupled to the connection part 112 is removed, and the coating solution injection line 142 is coupled to the connection part 112. Then, the coating solution 30 stored in the coating solution injection vessel 141 is injected into the tray vessel 111 through the connection part 112 by using pumping force of the coating solution injection pump 143. When the coating solution 30 is injected into the tray vessel 111, the coating solution is impregnated into the fiber sheet 10, in which the silica precursor is gelated, to modify the surface of the fiber sheet 10.

Here, as illustrated in FIG. 1, in the surface modification device 140, since the coating solution 30 is injected in a state in which the tray vessel 111 is turned upside down, the coating solution 30 may not be uniformly impregnated into the fiber sheet 10. To prevent this problem from occurring, the surface modification device 140 includes a coating solution collection member 144 in which the coating solution 30 forcibly ascends by using the suction force to impregnate the coating solution into the fiber sheet 30, and also, the ascending coating solution 30 is discharged to the outside and then collected again into the coating solution injection vessel 141.

That is, the coating solution collection member 144 includes a suction valve 144a disposed between the tray device 110 and the rotation rod 121 to forcibly discharge the coating solution injected into the tray device 110 through the suction force, a coating solution discharge line 144b through which the coating solution 30 discharged by the suction valve 144a is collected to a hollow defined in the rotation rod 121 and which is coupled to the rotation rod 121 to collect the coating solution 30 collected into the rotation rod 121 into the coating solution injection vessel 141, and a collection pump 144c generating the suction force in the suction valve 144a. Here, the coating solution discharge line 144b may be directly connected to the suction valve 144a.

As described above, the coating collection member 144 may be used to uniformly modify the surface of the fiber sheet 10, and particularly, the coating solution 30 may be collected to be used again.

The coating solution 30 is prepared by mixing ethanol with ammonia water (NH4OH).

Transfer Device

The apparatus of manufacturing the aerogel sheet further include a transfer device 150 for easily transferring the fiber sheet 10.

That is, the transfer device 150 adsorbs the uppermost fiber sheet 10 of the loaded fiber sheets 10 to transfer the fiber sheet 10 up to the tray device 110 or adsorbs the fiber sheet 10 of which the surface is modified to transfer the fiber sheet 10 to the outside of the tray device 110 and thereby to transfer the fiber sheet to a preset place.

As described above, the transfer device 150 includes a guide rail 151 installed from a loading place, at which the fiber sheet 10 is loaded, to the tray device 110 and a transfer member 152 movably installed on the guide rail 151 to adsorb the fiber sheet 10 and transfer the fiber sheet 10 along the guide rail 151.

[Method for Manufacturing Aerogel Sheet]

A method for manufacturing the aerogel sheet by using the apparatus of manufacturing the aerogel sheet, which includes the above-described constituents, according to the present invention will be described as follows.

Figure 7:
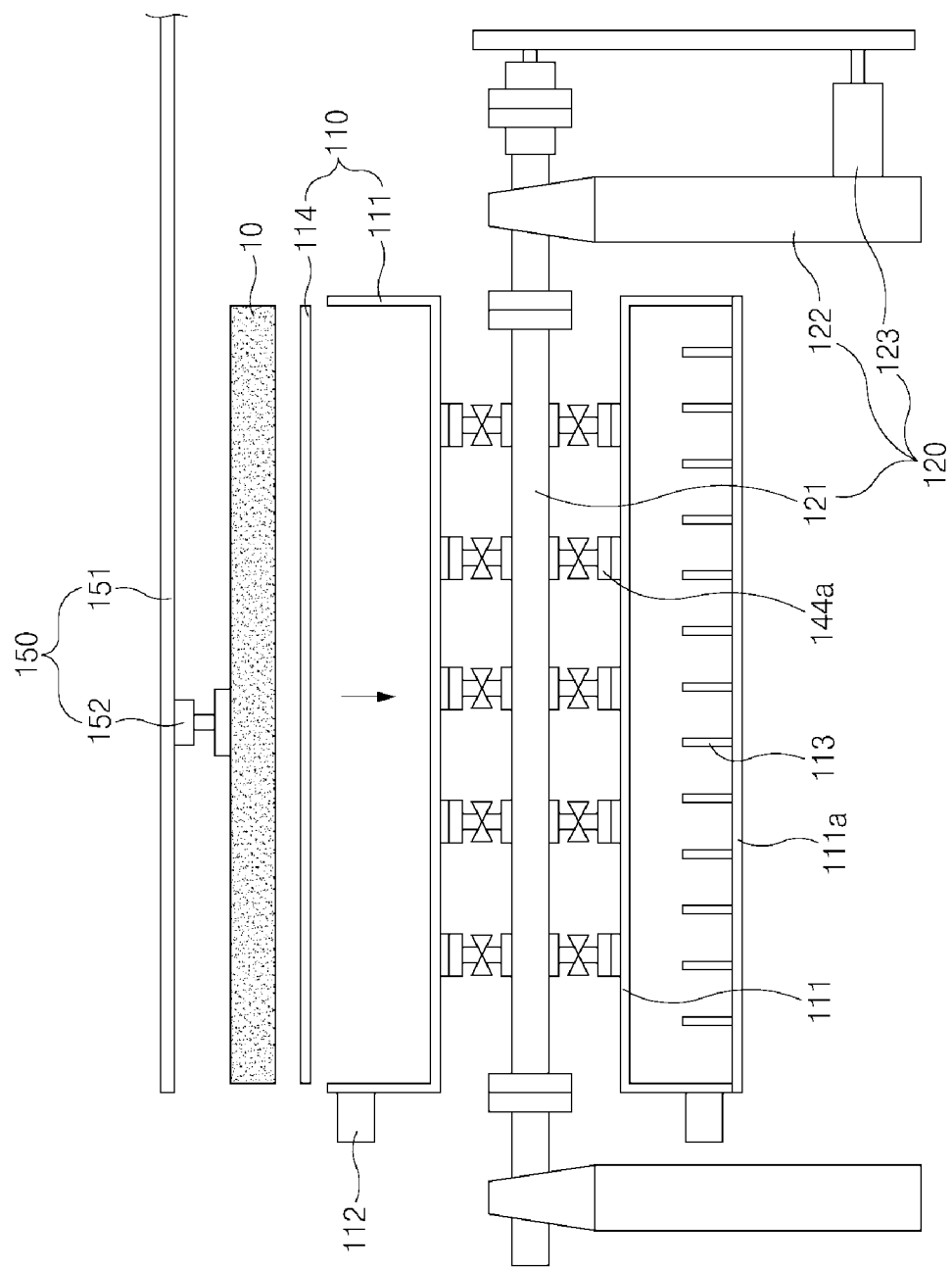
FIGS. 7 to 10 are views illustrating an operation state of the apparatus of manufacturing the aerogel sheet according to the present invention.

As illustrated in FIG. 7, the fiber sheet 10 loaded at the loading place (not shown) is adsorbed through the transfer member 152 of the transfer device 150 to transfer the fiber sheet 10 up to an upper portion of the tray device 110 along the guide rail 151.

Then, the cover 111a of the tray vessel 111 is opened in the tray device 110, and the gap member 114 is inserted into the tray vessel 111, and then, the transferred fiber sheet 10 is inserted. Then, the cover 11a is closed to seal the tray vessel 111.

Here, the partition wall 113 disposed on the rear surface of the cover 111a may push the fiber sheet 10, and thus, the fiber sheet 10 may be fixed without being shaken.

Figure 8:
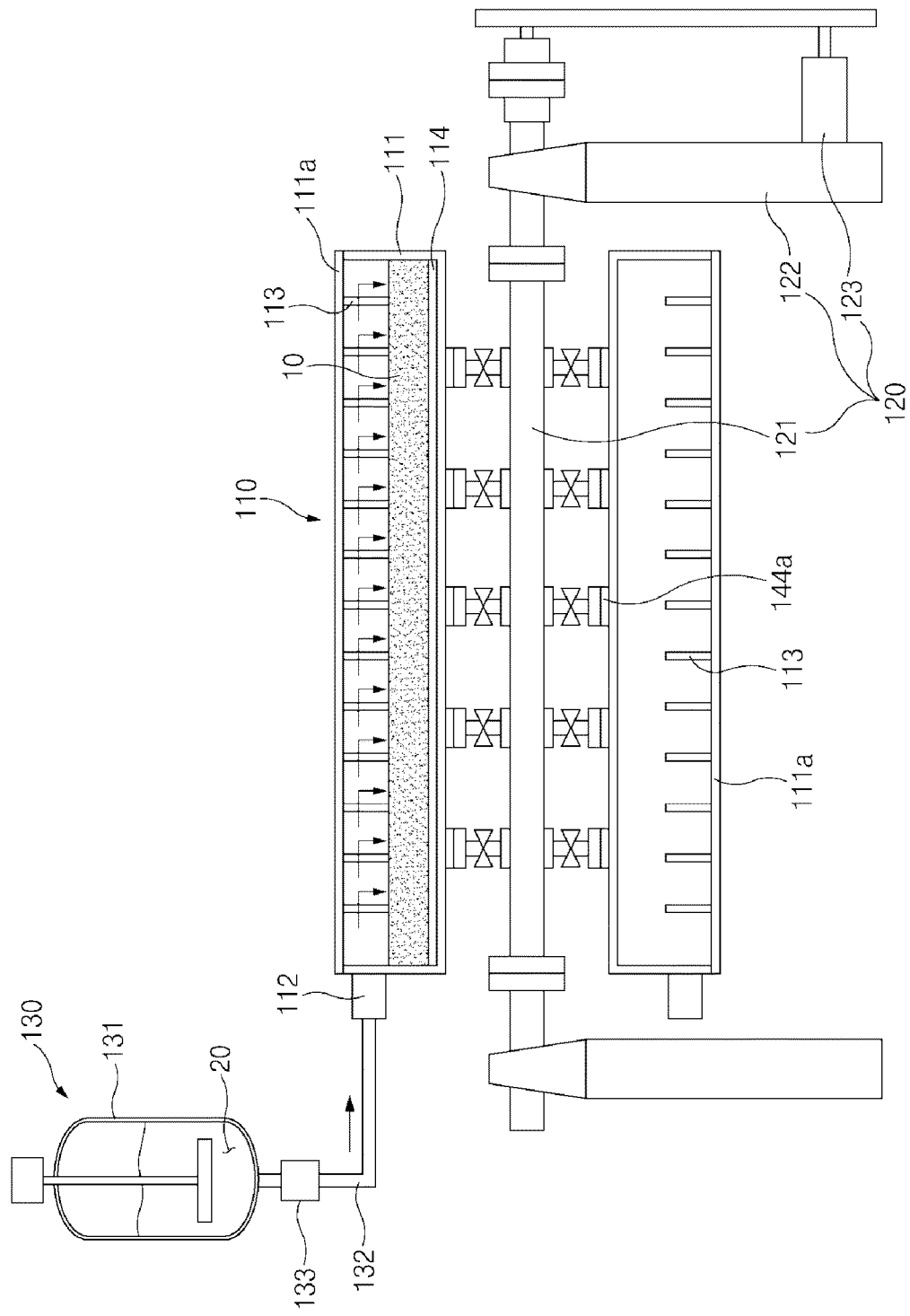

In this state, as illustrated in FIG. 8, the silica precursor 20 is injected into the tray vessel 111 through the silica precursor injection device 120 to impregnate and gelate the silica precursor 20 in the fiber sheet 10.

That is, the silica precursor stored in the precursor injection vessel 130 is injected into the tray vessel 111 through the silica injection line 132. Then, the silica precursor 20 is impregnated into the fiber sheet 10 accommodated in the tray vessel 111 and gelated by the gelling catalyst contained in the silica precursor 20. Here, the silica precursor 20 is stably introduced from one end to the other end of the tray vessel 111 while passing through the through-hole 113a of the partition wall 113. Thus, the silica precursor 20 may be gelated with the uniform thickness on the surface of the fiber sheet 10.

Figure 9:
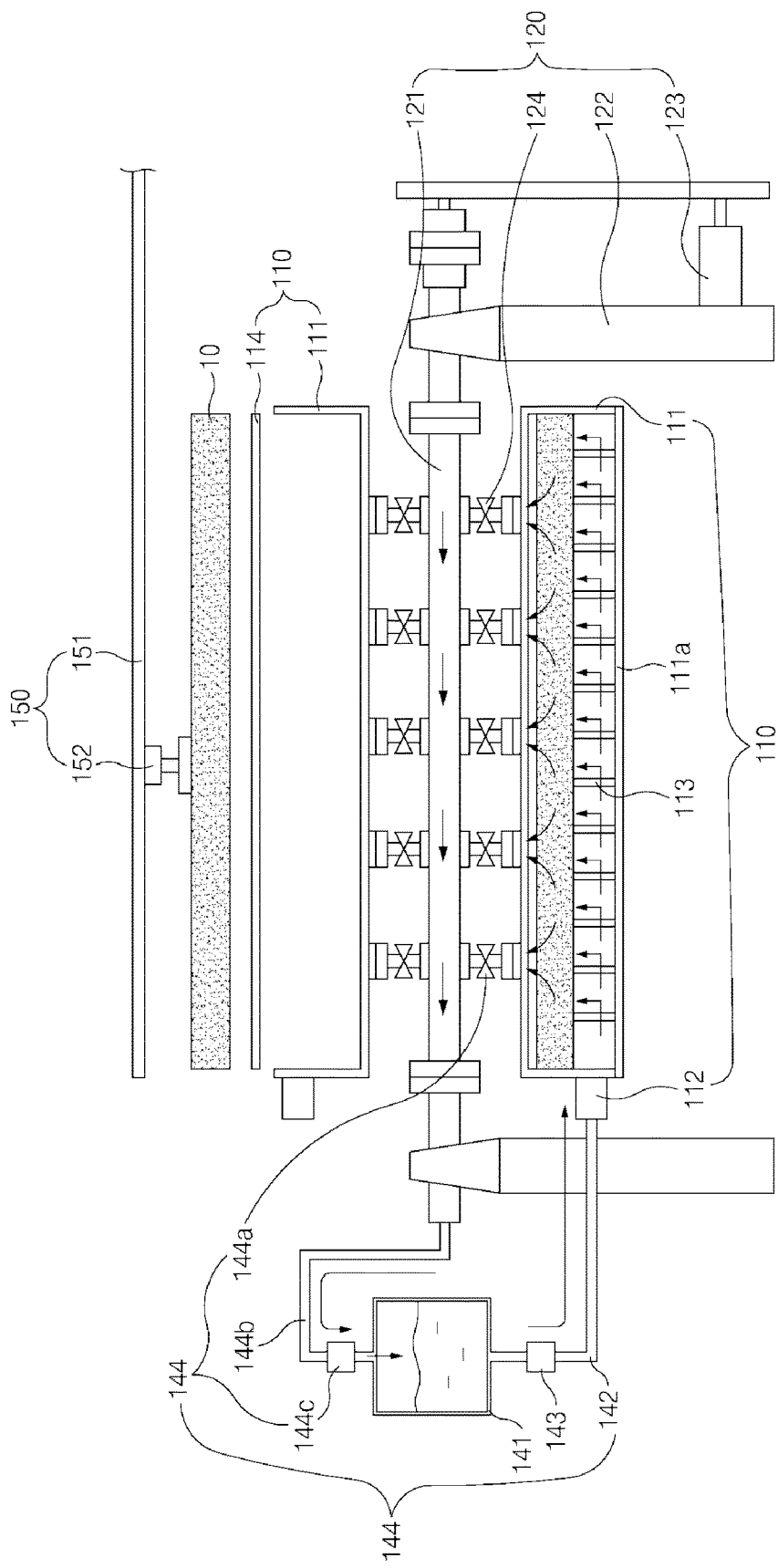
Figure 10:
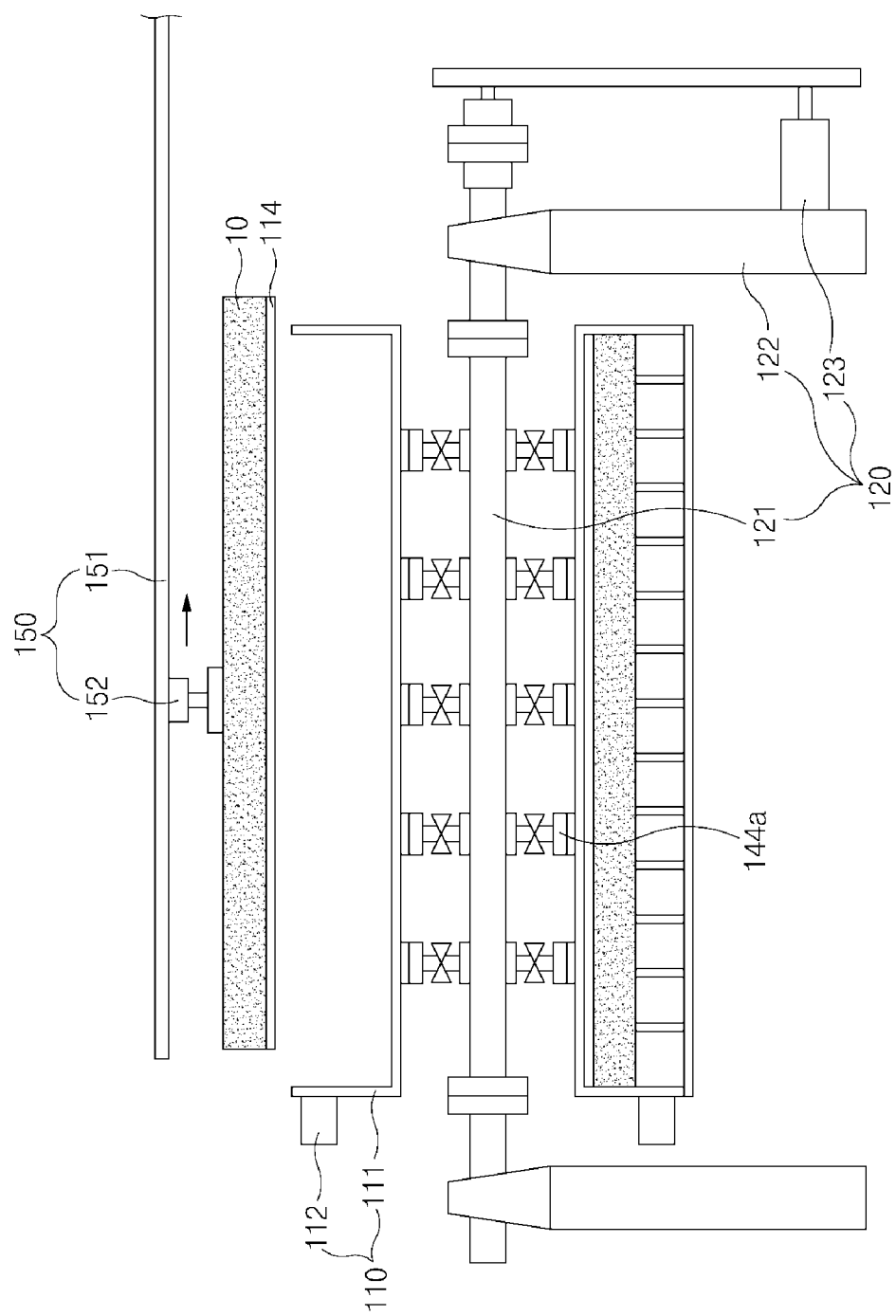

As described above, when the gelation of the silica precursor is completed, as illustrated in FIG. 9, the tray device 110 rotates downward to be returned upside down through the rotation device 120.

That is, when the rotation rod 121 rotates through the driving member 123 of the rotation device 120, the tray device 110 is interlocked with the rotation rod 121 to rotate downward. Here, the tray device 100 rotates about the rotation rod 121 to be returned upside down.

In this state, the precursor injection line 132 coupled to the connection part 112 is removed, and the coating solution injection line 142 is coupled to the connection part 112.

Then, the coating solution 30 is injected into the tray vessel 111 through the surface modification device 140 to modify the surface of the fiber sheet 10 in which the silica precursor is gelated.

That is, in the surface modification device 140, the coating solution 30 stored in the coating solution injection vessel 141 is injected into the tray vessel 111 through the coating solution injection line 142 by the pumping force of the coating solution injection pump 143. Then, the coating solution 30 is impregnated into the surface of the fiber sheet 10 to modify the surface of the fiber sheet 10. Here, the coating solution 30 is uniformly supplied to the entire surface of the fiber sheet 10 while passing through the through-hole 113a of the partition wall 113. Thus, the entire surface of the fiber sheet 10 may be uniformly modified.

In the surface modification device 140, the coating solution injected into the tray vessel 111 though the coating solution collection member 144 forcibly ascends to pass through the surface of the fiber sheet 10. Thus, the surface of the fiber sheet 10 may be more stably modified, and then, the ascending coating solution is collected to be reused.

That is, the coating solution collection member 144 suctions and collects the coating solution 30 injected into the tray vessel 111 through the pumping force of the collection pump 144c and the suction valve 144a, and the collected coating solution 30 is collected into the coating solution injection vessel 141 through the coating solution discharge line 144b.

Here, as illustrated in FIG. 9, the fiber sheet 10 and the gap member 114 are inserted into the tray device 110 rotating upward by the rotation device 120 as described above to perform preparation for impregnating the silica precursor 20. Also, the coating solution 30 is injected to the tray vessel 111 disposed at the lower side, and simultaneously, the silica precursor 20 is injected into the tray vessel 111 disposed at the upper side. Thus, the continuous process may be possible.

As described above, when the surface modification of the fiber sheet is completed, the aerogel sheet may be manufactured. When the aerogel sheet is manufactured as described above, the tray device 110 rotates upward. Then, the cover 111a of the tray vessel 111 is opened, and the aerogel sheet is transferred to a separate storage place through the transfer device 150.

Here, the coating solution is injected into the tray device 110 rotating downward to modify the surface of the fiber sheet 10 in which the silica precursor is gelated.

Thus, in the apparatus of manufacturing the aerogel sheet according to the present invention, the above-described processes may be continuously performed to mass-produce the aerogel sheet having the heat insulation, the durability, and the uniform thickness.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An apparatus of manufacturing an aerogel sheet, the apparatus comprising:
   a tray device in which a fiber sheet is accommodated;
   a rotation device comprising a rotation rod to which the tray device is fixed and a driving member rotating the rotation rod so that the tray device is rotated between an upper position and a lower position of the rotation rod in which the tray device is turned upside down in the lower position;
   a silica precursor injection device injecting a silica precursor into the tray device disposed in the upper position of the rotation rod to impregnate the silica precursor into the fiber sheet; and
   a surface modification device injecting a coating solution into the tray device disposed in the lower position of the rotation rod to modify a surface of the fiber sheet in which the silica precursor is impregnated.

2. The apparatus of claim 1, wherein the tray device comprises a tray vessel which has a structure that is sealed by a cover and in which the fiber sheet is accommodated and a connection part disposed on one side of the tray vessel and connected to the silica precursor injection device or the surface modification device.

3. The apparatus of claim 2, wherein one or more partition walls pushing and fixing the fiber sheet accommodated in the tray vessel are disposed on a rear surface of the cover.

4. The apparatus of claim 3, wherein each of the partition walls extends in a longitudinal direction or width direction of the cover and has a plurality of through-holes in a surface thereof.

5. The apparatus of claim 2, wherein a gap member having a plurality of punched holes is disposed between a bottom surface of the tray vessel and a bottom surface of the fiber sheet.

6. The apparatus of claim 5, wherein the gap member comprises a plate or mesh net having fine punched holes.

7. The apparatus of claim 1, wherein the silica precursor injection device comprises a silica injection vessel in which the silica precursor is stored and a precursor injection line through which the silica precursor stored in the silica injection vessel is supplied to be injected into the tray device.

8. The apparatus of claim 1, wherein the silica precursor is prepared by mixing silica sol with a gelling catalyst.

9. The apparatus of claim 8, wherein the silica sol is prepared by mixing tetraethyl orthosilicate (TEOS) with ethanol.

10. The apparatus of claim 9, wherein the tetraethyl orthosilicate (TEOS) comprises hydrolyzed TEOS.

11. The apparatus of claim 8, wherein the gelling catalyst is prepared by mixing ethanol with ammonia water (NH4OH).

12. The apparatus of claim 1, wherein the surface modification device comprises a coating solution injection vessel in which a coating solution is stored and a coating solution injection line through which the coating solution stored in the coating solution injection vessel is supplied to be injected into the tray device.

13. The apparatus of claim 12, wherein the surface modification device further comprises a coating solution collection member for collecting the coating solution injected into the tray device into the coating solution injection vessel.

14. The apparatus of claim 13, wherein the coating solution collection member comprises a suction valve disposed between the tray device and the rotation rod to forcibly discharge the coating solution injected into the tray device through suction force, a coating solution discharge line through which the coating solution discharged by the suction valve is collected into the coating solution injection vessel, and a collection pump generating the suction force in the suction valve.

15. The apparatus of claim 1, wherein the coating solution is prepared by mixing ethanol with ammonia water ($NH_4OH$).

16. The apparatus of claim 1, further comprising a transfer device transferring the fiber sheet up to the tray device or absorbing the fiber sheet of which the surface is modified to transfer the fiber sheet to the outside of the tray device.

* * * * *